March 17, 1959     W. J. FRIDERICI     2,877,740
ARTICLE-SUPPORTING MEMBERS OF DIELECTRIC MATERIAL FOR USE IN
FLOCKING APPARATUS AND WHICH ARTICLE-SUPPORTING MEMBERS ARE
PROVIDED WITH ELECTRICAL CONDUCTORS EXTENDING THEREALONG
Filed May 19, 1954     2 Sheets-Sheet 1

INVENTOR.
W. J. Friderici
BY
Hyde, Meyer, Baldwin & Doran
ATTORNEYS

INVENTOR.
W. J. Friderici
BY
Hyde, Meyer, Baldwin & Doran
ATTORNEYS

2,877,740

ARTICLE-SUPPORTING MEMBERS OF DIELECTRIC MATERIAL FOR USE IN FLOCKING APPARATUS AND WHICH ARTICLE-SUPPORTING MEMBERS ARE PROVIDED WITH ELECTRICAL CONDUCTORS EXTENDING THEREALONG

Wayne J. Friderici, Port Clinton, Ohio, assignor to The Standard Products Company, Cleveland, Ohio, a corporation of Ohio Application May 19, 1954, Serial No. 430,936

3 Claims. (Cl. 118—630)

This invention relates to improvements in an article support and more particularly to a support for an article during flocking in a flocking apparatus.

One of the objects of the present invention is to provide an article support for use in a flocking apparatus with said support detachably supporting and securing the article, masking some areas of the article from flocking, and/or beneficially affecting the electrostatic flocking field of the flocking apparatus so that uniform and good flocking results.

A further object of the present invention is to provide an article support characterized by its structural simplicity, economy of manufacture, and its operating efficiency.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 5 is a perspective view of the flocked article in the article support; while

Before the article support here illustrated is specifically described, it is to be understood that the invention here involved is not limited to the structural details or arrangement of parts here shown since article supports embodying the present invention may take various forms. It also is to be understood that the phraseology or terminology herein employed is for purposes of description and not of limitation since the scope of the present invention is denoted by the appended claims.

While the article support of the present invention might be adapted to support various articles in various manners for various purposes, it has been chosen to show this article support as being used to support an article during flocking in an electrostatic flocking apparatus.

Figure 1:
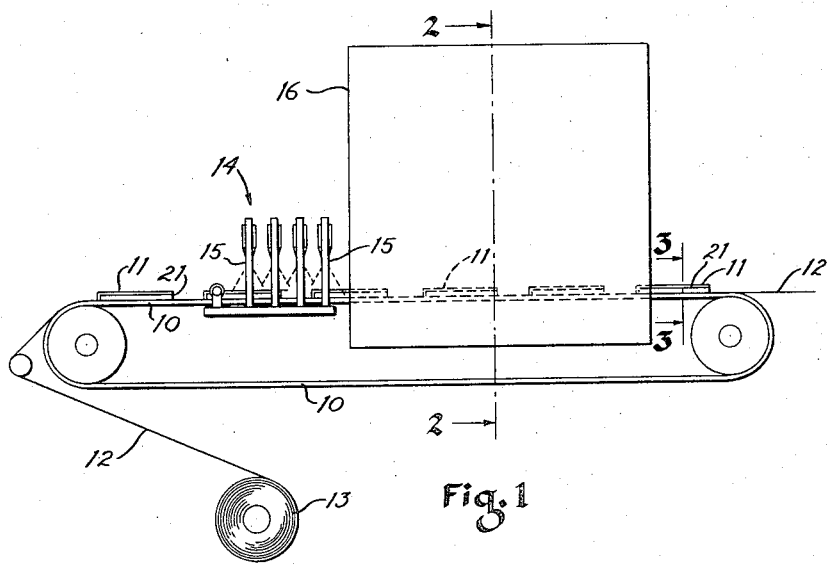
Fig. 1 is a side elevational view of a flocking apparatus with articles to be flocked travelling therethrough from left to right and with each article carried by an article support of the present invention.

Although the article support can be used with a wide variety of flocking apparatuses, only one typical type of flocking apparatus will be described. In Fig. 1, an endless conveyor belt 10 is driven by the end pulleys with its top conveyor flight travelling from left to right through the flocking apparatus to serve as a means for conveying the article to be flocked and the article support through the flocking apparatus. Each article 11 to be flocked is mounted on its support which in turn is placed on top of a disposable paper strip 12 on the conveyor belt 10 with strip 12 being fed from a reel 13 as the top flight of the endless conveyor belt 10 pulls the disposable paper strip through the flocking machine. Any excess flock or glue will land on this disposable paper strip 12 instead of building up on the top of the endless conveyor belt 10. The articles 11 move from the left toward the right through the flocking apparatus past the glue spraying station 14 having a plurality of spaced nozzles therealong operating in suitable timed relationship with the passage of the articles to be flocked by any convenient timing device, such as the one disclosed in my copending U. S. patent application Serial No. 361,726, filed June 15, 1953, and on which was issued on October 29, 1957 Patent No. 2,811,130 entitled "Automatic Coating Spray Unit for Flocking Machines." Then the article 11 passes through the flock applying compartment or cabinet 16 having a flock dispensing hopper 17 in Fig. 2 causing a downward flock flow by gravity while the article 11 passes through this compartment across the downwardly flowing flock stream.

Figure 2:
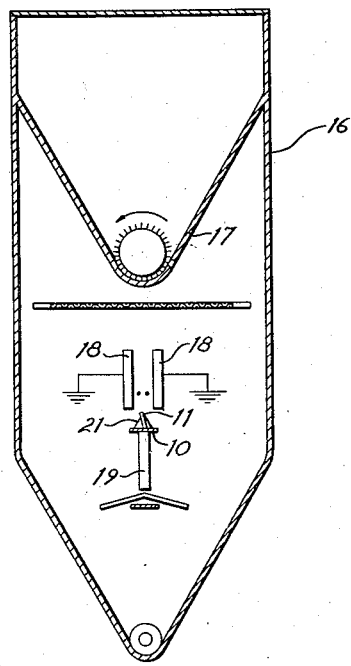
Fig. 2 is a vertical, transverse view through the flocking apparatus wherein the flock is applied.

The downwardly flowing flock is electrostatically affected so that the flock in the flow stream is correctly oriented and deposited on the glue previously sprayed on article 11 and article 11 is flocked where desired. Two grounded electrodes 18, 18 in Fig. 2 are located upstream or above the article 11 with the downward flock flow stream passing therebetween and in a downward direction toward stationary electrode 19 on the apparatus frame and located below and downstream from the article 11. These electrodes 18 and 19 are electrically connected together by an electrostatic flocking unit electrical circuit of any conventional design. Many flocking electrical circuits are well-known to anyone versed in the art and any satisfactory circuit can be used. For example, an alternating potential between electrodes 18 and electrode 19 of about 75,000 volt peak potential can be impressed thereon with this circuit providing either alternating current or varying direct current type potential. For example, the arrangement of these electrodes and the electrical circuit therebetween can be of the type disclosed in my copending U. S. patent application Serial No. 361,791, filed June 15, 1953, and entitled "Apparatus for Preventing Flock Build-up on a Flocking Machine Electrode," now Patent No. 2,811,134 of October 29, 1957. However, it should be clearly understood that the electrode arrangement, circuit, and the potential or voltage varying characteristics need not be so limited but can be of any design satisfactory for flocking.

Also, although the flock material is travelling in a flow stream moving downwardly toward the article 11 in the present disclosure during the flocking operation, it should be readily apparent that the present invention in a support can be used in any type of flocking machine wherein the flock travels in a flow stream against the article from any angle, for example, either downwardly or upwardly against the article. For example, sometimes the article being flocked is oriented to move vertically while the flock material is travelling in a flow stream extending in a general horizontal direction against the article while other times the article is oriented by suspension from a support while the flock flow stream travels vertically upwardly against it. For simplicity in illustration, only one orientation of the article being flocked is shown in the drawings and it should be readily understood that any of these other mentioned orientations can exist with the flock stream directed against the article and with the electrodes correspondingly located upstream or downstream from the article along the flow stream.

Figure 3:
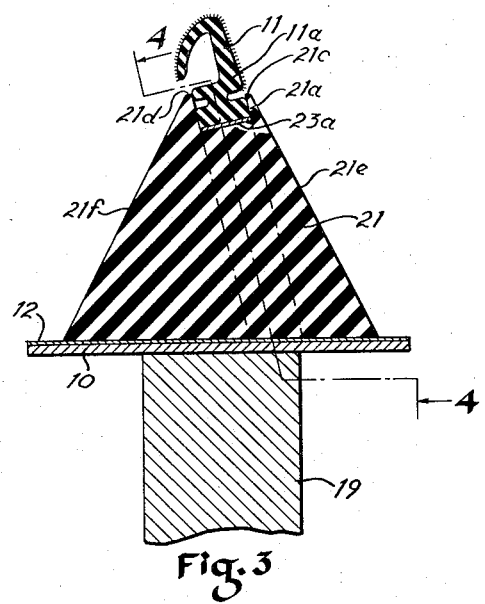
Fig. 3 is a vertical, transverse, enlarged section through the article support, the flocked article, conveyor belt therefor, and the lower electrode of the elctrostatic flocking field.
Figure 4:
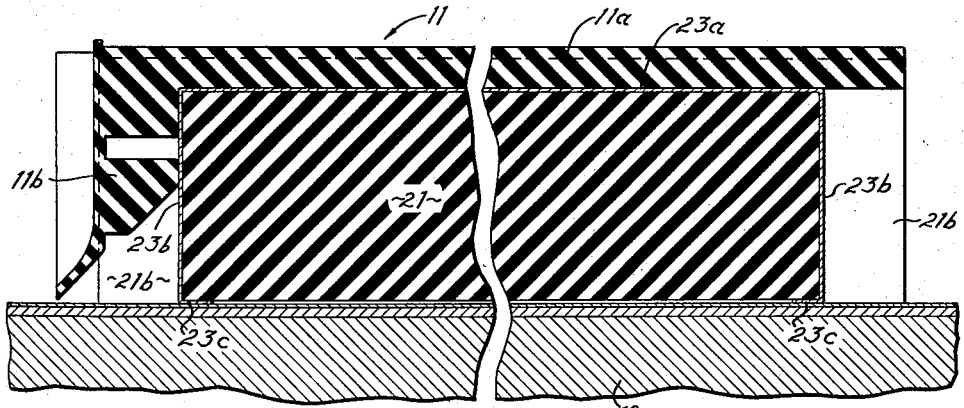
Fig. 4 is a longitudinal sectional view taken along the line 4—4 of Fig. 3.
Figure 5:
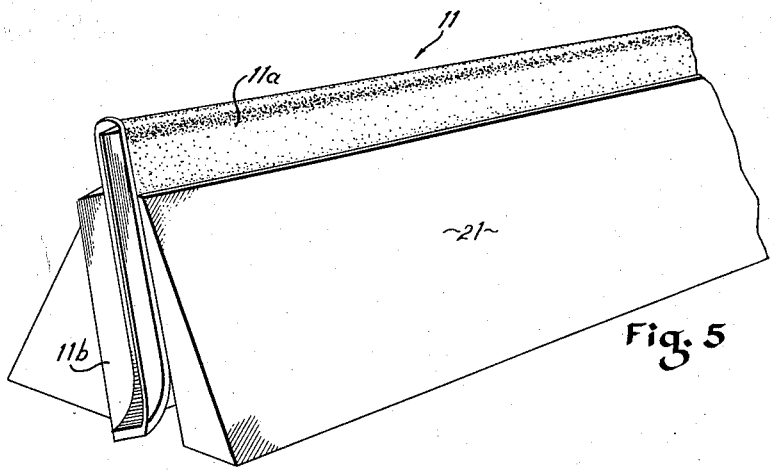
Figure 6:
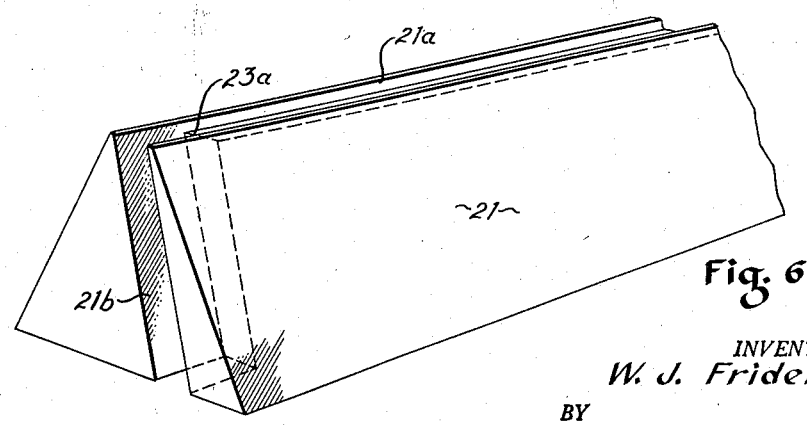
Fig. 6 is a perspective view of the article support with the article removed.

Although any of a wide variety of articles can be flocked advantageously with this article flocking support, the article specifically shown herein in Figs. 3, 4 and 5 is a flocked rubber sealing strip for an automobile. This article 11 has one portion 11a in Fig. 4 extending horizontally and generally transverse to the flock flow stream and has a second portion 11b in the form of a downwardly extending arm generally extending downstream from the first portion 11a so that the article is generally an L-shape. This unusual shape of the article creates problems in flocking so that an article support must have certain characteristics if satisfactory flocking is to be obtained.

The article support is shown at 21. It has the following features: (1) it detachably supports the article 11 during flocking of said article, (2) it masks some of the outside area of the article 11 to prevent flocking thereof by preventing glue spray and flock reaching this area, and (3) it provides a good electrostatic flocking field so that uniform and good flocking will result even though the major portion 11a to be flocked is located a substantial distance above or upstream from the lower flocking electrode 19 because of the design of the article in having a depending arm 11b thereon.

The support 21 is formed of wood, rubber (semi-hard rubber being preferred), or other dielectric or insulating material and has a plurality of article retaining grooves therein including a horizontal groove 21a for releasably holding article portion 11a and slightly inclined but generally vertical, parallel grooves 21b, 21b located at opposite ends of horizontal groove 21a with the groove 21b at the left of Fig. 4 housing article portion 11b. Of course, having two inclined grooves 21b permits the choice of two different orientations of the top of article portion 11a so that the article may be oriented for best flocking. The resiliency of the rubber article 11 and the friction between the rubber and the article support groove side walls in combination with the shape of the grooves either singularly or in combination coact together to retain the article 11 in proper position for flocking.

This article support 21 also effectively serves as a mask to prevent flocking of some areas on article 11. For example, the article portion 11a is only flocked on the outer portion of the upwardly extending hook thereon in Fig. 3 with the outer surface of the lower portion effectively protected from flocking. It should be noted that the lip 21d of the article support on the left is slightly higher than the lip 21c on the right so that the full right side of the hook can be completely flocked while the base portion thereof on the left is completely shielded from flocking. Of course, the area of article portion 11b located inside the groove 21b in Fig. 4 is similarly shielded from flocking.

If desired, masking tape can be applied to the side walls 21e and 21f in Fig. 3 of the article support so that excessive flock build-up does not occur thereon. The old masking tape can be removed and new applied whenever the flock build-up becomes too great.

The article support 21 also has means to assure a good electrostatic flocking field so that a uniform and good flocking coat will be applied to the article. Since the article portion 11a is located so far upstream or above the lower or downstream electrode 19, the electrostatic flocking field at this article portion 11a is not normally satisfactory.

It has been found that flocking results depend on the pattern of the electrostatic field since the flock follows this pattern. The flock particles are apparently oriented by the voltage induced thereon and they follow the shape of this field. The shape of the field is determined by the conductivity (or resistance) and shape of the materials located between the electrodes 18, 19 upon which a difference in potential is impressed. During flocking, this field has located therein air, flock, the article to be flocked and, in the present disclosure, article support 21.

It has been found that the shape or pattern of this field can be changed by variations in conductivity of and shape of the article support 21. Two ways of changing this field pattern have been discovered to get uniform and satisfactory flocking on the exposed areas of article 11.

First, the article support 21 is formed of insulating or dielectric material, such as rubber, wood, etc., to provide more resistance or dielectric loss in the field to affect its pattern. The shape of support 21 also may be changed so as to direct the flock where desired. For example, the upward taper of support side walls 21e, 21f in Fig. 3 concentrates the flock field at lips 21c, 21d so that the exposed sides of article 11 are uniformly, fully and satisfactorily flocked.

Second, an electrical conductor can be carried by article support 21 to suitably magnify the field. This conductor has in Fig. 4 a horizontal portion 23a at the bottom of groove 21a, vertical leg portions 23b, at opposite ends thereof and inwardly directed portions 23c at the upper surface of the conveyor belt 10 and disposable paper strip 12. All of these portions are electrically conductive and are connected together to form a generally closed zone of influence with electrode 19 in Fig. 4. They are formed from any of a variety of electrical conductive materials deposited in the bottoms of grooves 21a and 21b. This electrical conductive material may take the form of metallic or aluminum paint, a metallic coating, or a metal strip, etc. This conductor is closely adjacent the article with the conductor portion 23a located immediately downstream from the article portion 11a so that the conductor has a direct influence on the electrostatic characteristics of the flocking field when there is a voltage or potential difference between the electrodes 18, 19 in Fig. 2. Hence, this conductor acts somewhat like another flocking electrode to concentrate the field at the bottom of this groove so that the exposed sides of article 11 are uniformly, fully and satisfactorily flocked.

Each conductor portion is protected from flock build-up thereon. It should also be noted that some portions of the conductor on the article support 21 will always have actual contact with and be in close association with the article being flocked so that no flock build-up can occur on the conductor. Each conductor portion is either located at the bottom of one of the article holding grooves in the article support 21 or otherwise protected.

Although this invention has been specifically described with reference to article 11 and article support 21 and the construction thereof, it should be clearly understood that the concept of having the article support formed of dielectric or insulating material, having the support shaped to properly direct the electrostatic field, and/or having a conductor on the article support during flocking can be used for flocking other article constructions; and this is especially true when the major portion of the article to be flocked is located, because of necessity, a substantial distance away from one of the flocking electrodes.

Various changes in details and arrangement of parts can be made by one skilled in the art without departing from either the spirit of this invention or the scope of the appended claims.

What I claim is:

1. In flocking apparatus having an electrostatic field produced by spaced upper and lower electrodes and also having conveyor means for transporting articles to be flocked through said electrostatic field, the improvement comprising article-supporting members carried by said conveyor means and upon which members the articles to be flocked are removably supported as they are transported through said electrostatic field, each of said article-supporting members having an elongated body portion of dielectric material and an electrical conductor carried thereby and spaced intermediate said electrodes and being electrically insulated from the latter and extending along said body portion in close proximity to the article supported on said member, said electrical conductor being effective to concentrate said electrostatic field adjacent the article to be flocked.

2. In flocking apparatus having an electrostatic field produced by spaced upper and lower electrodes and also having conveyor means for transporting articles to be flocked through said electrostatic field, the improvement comprising article-supporting members carried by said conveyor means and having elongated body portions which are longitudinally grooved for the removable reception of the articles to be flocked, said body portions being of dielectric material and having electrical conductors extending along the grooves thereof and spaced intermediate said electrodes and being electrically insulated from the same and effective to concentrate said electrostatic field at said elongated body portions of said article supporting members.

3. A support for an article to be flocked as said article passes through an electrostatic field produced by spaced electrodes and wherein said article has an elongated main portion and a depending end extension, said support comprising a body portion of dielectric material with a slot extending along the top thereof and joining slots extending along the ends thereof, said top slot receiving the main portion of said article and either of said end slots receiving the depending end extension of said article, and said support also having an electrical conductor within and extending along the top and end slots of said support in close proximity to the supported article and electrically insulated from said electrodes and effective to concentrate the electrostatic field at said top and end slots of said body portion.

References Cited in the file of this patent

UNITED STATES PATENTS

| | | |
|---|---|---|
| 1,422,964 | Greenbaum | July 18, 1922 |
| 1,747,704 | Glaudel | Feb. 18, 1930 |
| 1,855,869 | Pugh | Apr. 26, 1932 |
| 2,191,827 | Benner et al. | Feb. 27, 1940 |
| 2,194,253 | Benner et al. | Mar. 19, 1940 |
| 2,231,324 | Crompton | Feb. 11, 1941 |
| 2,457,256 | Melton et al. | Dec. 28, 1948 |
| 2,509,448 | Ransburg et al. | May 30, 1950 |
| 2,662,833 | Helmuth | Dec. 15, 1953 |
| 2,722,908 | Tuttle et al. | Nov. 8, 1955 |
| 2,730,988 | Starkey | Jan. 17, 1956 |